United States Patent [19]

van Maanen

[11] 4,261,457

[45] Apr. 14, 1981

[54] ARTICLE POSITIONING MECHANISM

[75] Inventor: Johannes D. van Maanen, Berkel en Rodenrijs, Netherlands

[73] Assignee: Tevopharm-Schiedam B.V., Netherlands

[21] Appl. No.: 75,195

[22] Filed: Sep. 12, 1979

[30] Foreign Application Priority Data

Sep. 14, 1978 [NL] Netherlands ........................ 7809365

[51] Int. Cl.³ ............................................ B65G 47/31
[52] U.S. Cl. .................................... 198/461; 198/722
[58] Field of Search ................ 198/459, 461, 722, 723

[56] References Cited

U.S. PATENT DOCUMENTS

| | | | |
|---|---|---|---|
| 2,155,088 | 4/1939 | Hopkins | 198/723 X |
| 3,176,824 | 4/1965 | Eldred et al. | 198/723 |
| 3,721,330 | 3/1973 | Crawford et al. | 198/461 |
| 3,923,142 | 12/1975 | Rysti | 198/461 |

*Primary Examiner*—James L. Rowland

[57] ABSTRACT

Apparatus for positioning articles which are continuously fed by a conveyor belt in a closed row between the carriers of a drag conveyor, comprising equally spaced apart blades movable in a vertical, endless path located above and in the proximity of the discharge end of the conveyor belt. The blades are arranged such that in travelling along the lower path portion they are capable of entering between the articles in engaging relationship. A device is provided for accelerating the leading article with a blade being positioned between the article and the next article at its rear.

6 Claims, 4 Drawing Figures

ARTICLE POSITIONING MECHANISM

The present invention relates to an apparatus for positioning articles between the carriers of a drag conveyor, said articles being fed in a continuous closed row by means of a conveyor belt.

An apparatus of this kind is particularly suitable for use in transferring products being prepared in a continuous process to an apparatus where the products are packed separately.

It is the object of the invention to provide an apparatus which is particularly suitable for handling rectangular and oblong articles with bevelled edges, such as chocolate bars.

Said object is achieved in that the apparatus according to the invention comprises a system of equally spaced apart blades, which blades are movable in a vertical, endless path lying above and in the proximity of the discharge end of the conveyor belt, which blades are arranged such that in travelling along the lower path portion, said blades are capable to enter between the articles in engaging relationship, while means are provided for accelerating the present leading article, a blade being positioned between said article and the next article at its rear.

Thus, during the circulating movement of the blades, each time one blade is moved between two adjacent and abutting articles of the continuously advancing row of articles, so that the leading article in the direction of movement is being relieved of the thrust, whereupon the movement of said article is accelerated in the direction of movement by accelerating means, e.g. conveyor belts or a conveyor roller, so that a gap is formed between said article and the article immediately at its rear, and a carrier of the drag conveyor can enter said gap.

The blades are advantageously mounted for a pivotal movement about an axis extending perpendicular to the plane of the endless path, means being provided to keep the blades at least during their movement along the lower path section in a position so that said blades are capable to enter between the articles, and the accelerating means are formed by means for imparting a forward pivotal movement to a blade about its pivot axis in the direction of movement each time after a blade has entered between the two leading articles.

In this way, each time the leading article is accelerated harmonically in the direction of movement by the pivotal movement of the blade engaging said leading article at its rear.

The blades are preferably mounted on the one ends of stub shafts which are rotatably mounted in openings, said openings being formed in a vertical, rotatable disc at equally spaced apart positions at its circumference while the stub shafts at their other ends, located at the other side of the disc, are provided with a crank means having a transversely projecting guide means provided at its free end portion, a substantially stationary endless guide track being provided, which is facing said other side of the disc and extends parallel thereto, in which track said guide means of the cranks are accomodated, said guide track at its lower side comprising a comparatively short portion, the radius of curvature of which changing to a comparatively high degree.

The guide track may advantageously comprise two portions hinged together at the lower side of the guide track, means being provided for imparting a pivotal movement to (seen in the direction of movement) the rear portion about the pivot point from or towards the other stationary portion, in which said comparatively short portion of the guide track belongs to the stationary portion. Thus, the position of the blades can be changed at the lower part of the track, so that articles of different sizes can be handled.

The guide track may be formed by a groove, a portion of the inner edge of the groove near the lower side of the guide track being mounted for an inwardly directed movement while it is kept in the position in alignment with the other portion of the inner edge by a spring means. In this way, when entering between two articles each blade can yield resiliently in the direction opposed to the direction of movement. In the inwardly urged position the movable portion may advantageously cooperate with a switch, so that the apparatus is stopped when there is a misformed article.

An embodiment of the apparatus including pivotable blades according to the invention will now be described more in detail with reference to the drawing, wherein.

Figure 1:
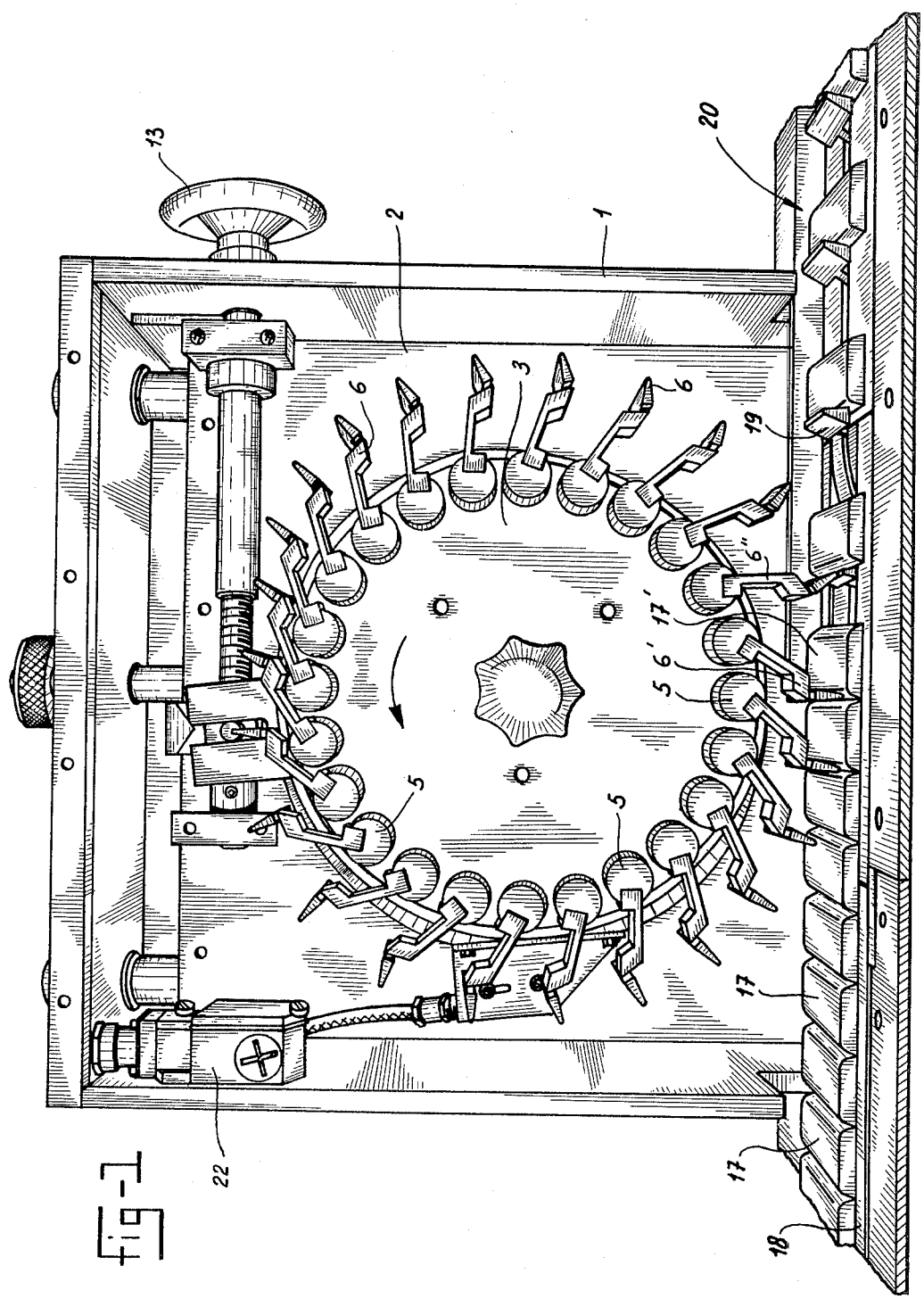
FIG. 1 is a side elevation of an apparatus in accordance with the invention.
Figure 2:
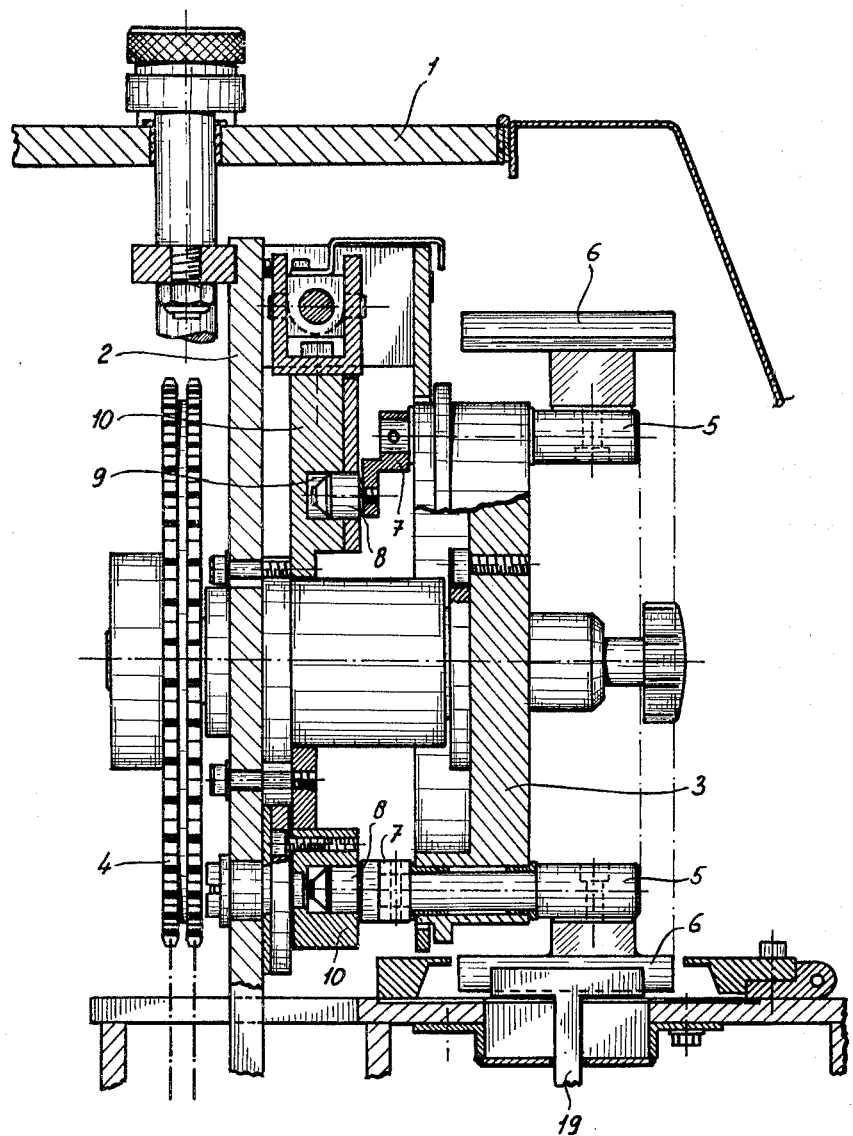
FIG. 2 is a cross-sectional view of said apparatus.

As illustrated in FIG. 1 and 2, the apparatus comprises a housing 1 in which a plate 2 is mounted for an up and down movement. In said plate 2 a circular disc 3 is journaled which is driven for rotation in the direction of the arrow (FIG. 1) through sprockets 4 by drive means (not illustrated). In disc 3 equally spaced apart openings are provided and each opening carries a stub shaft 5 rotatably disposed therein. On each stub shaft 5 near its one end, a blade 6 is mounted and near its other end, a crank 7 is provided, said crank having a transversely projecting guide means 8 at its free end portion.

The guide means 8 are accomodated in a guide track formed by a groove 9 provided in a body 10 mounted onto plate 2.

Figure 3:
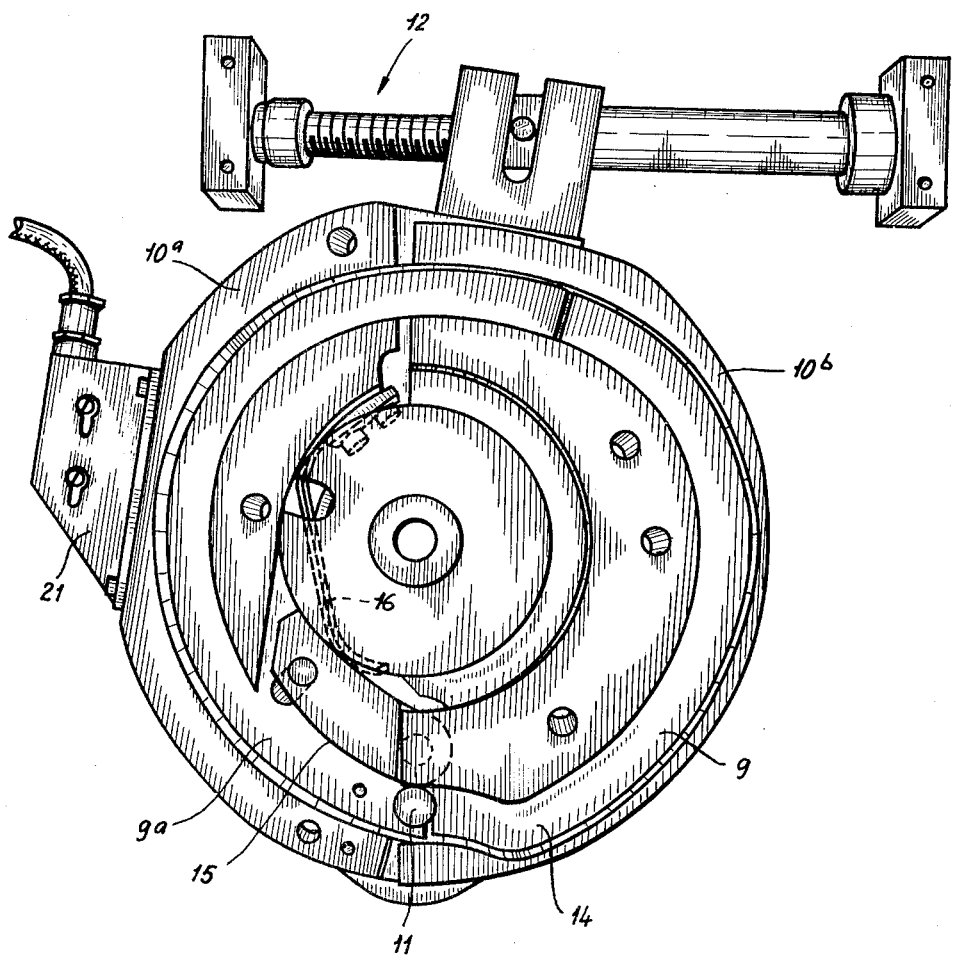
FIG. 3 illustrates the guide track in one position, said guide track appertaining to the apparatus according to FIG. 1 and 2.
Figure 4:
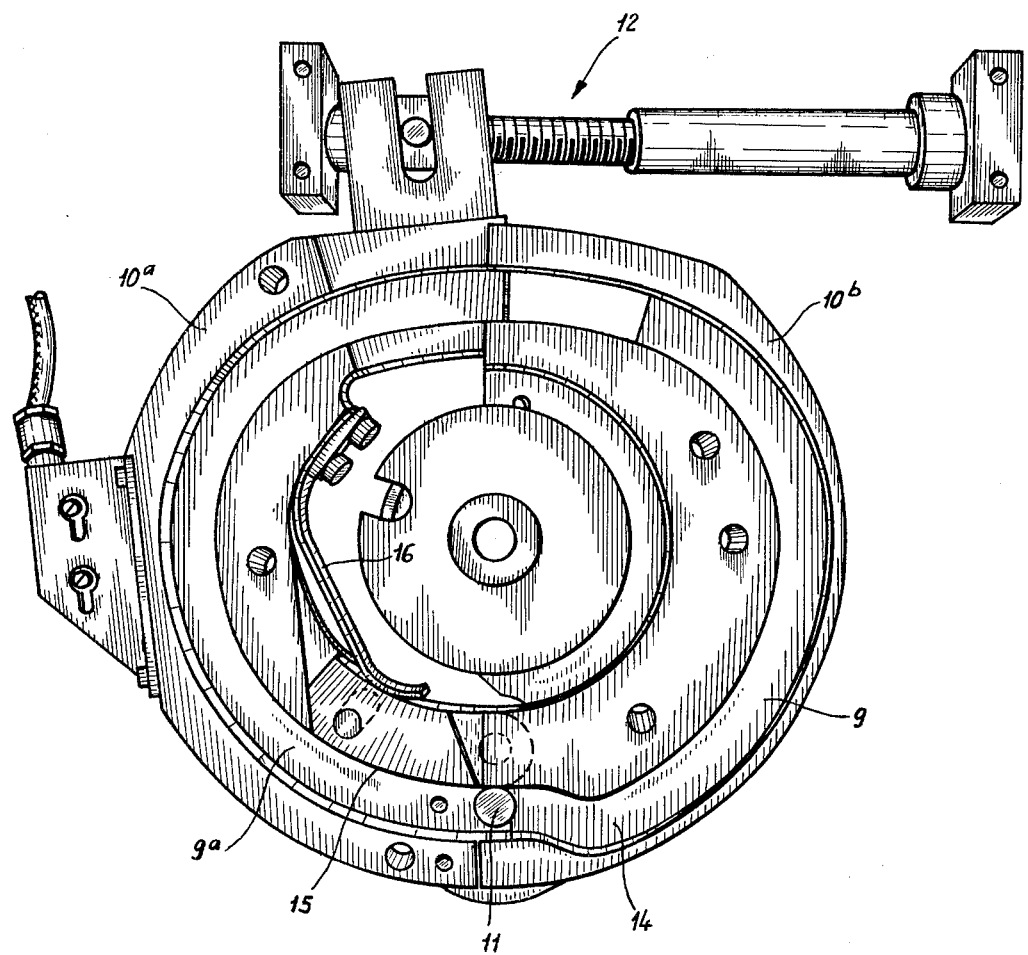
FIG. 4 illustrates said guide track in the other position.

As illustrated in FIG. 3 and 4 the body 10 comprises two parts hinged together at reference numeral 11, so that the one portion 10a can pivot relative to the other stationary portion 10b. Consequently, groove 9a can be moved nearer towards and further away from the axis of rotation (FIG. 3 and 4 resp.). Thus, when travelling along guide track 9a the position of the blades 6 can be changed. Portion 10a of the body should then be pivoted about pivot point 11 by means of the screw jack 12, said screw jack being operated by handwheel 13 (FIG. 1).

As illustrated in FIG. 3 and 4, almost immediately in front of hinge point 11 the groove 9 comprises a comparatively short portion 14, the radius of curvature of which changes considerably. It is, thus, achieved that when travelling along said portion 14, the guide means 8 impart also a forward movement to the blades 6 through cranks 7 and stub shaft 5.

As shown in FIG. 3 and 4, an inner edge portion 15 of groove 9a is mounted for an inwardly pivotal movement (FIG. 3). A spring 16 acts on said edge portion, said spring keeping the edge portion in its normal position (FIG. 4). In the position, illustrated in FIG. 3, edge portion 15 cooperates with the micro switch 21, with which the entire apparatus can be stopped through the limit switch 22.

When the apparatus is operating, disc 3 rotates in the direction indicated by the arrow in FIG. 1, the blades 6 engaging the articles 17 and entering between them which articles are fed in a continuous closed row by the conveyor belt 18. As soon as a blade 6 has entered between two articles 17 (illustrated in FIG. 1 for blade 6'), the leading article 17' will be relieved of the thrust and, shortly afterwards, blade 6' will pivot forwards (illustrated for blade 6'') by the fact that the appertaining guide means 8 travels along portion 14 of the guide track 9, as a result of which the leading article is harmonically accelerated in the direction of movement and a gap is created between said article and the next trailing article. A carrier 19 of drag conveyor 20 can enter said gap so that the articles are conveyed by said carriers 19 to a packaging machine.

When articles 17 of a different width have to be handled, the guide track portion 9a is displaced more or less by means of the handwheel 13, as a result of which the position of the blades 6 can be changed when they approach the articles 17.

If there is a misformed article in the row of articles 17, a blade 6 will not enter between two articles but it will strike an article, a result of which said blade, due to the fact that the appertaining guide means 8 is located in the guide track portion having the movable inner edge, will pivot rearwardly in the direction opposed to the direction of rotation. As a result thereof, switch 21 cooperating with the movable edge portion 15 is operated and the apparatus is stopped.

By the fact that the plate 2 is mounted for up and down movement in the housing 1, the entire apparatus may be raised, so that the position of the blades 6 is not changed; this is important in cleaning the apparatus and when misformed articles have to be removed.

I claim:

1. Apparatus for positioning articles between the carriers of a drag conveyor, said articles being fed in a continuous closed row by means of a conveyor belt, characterized in that the apparatus comprises a system of equally spaced apart blades movable in a vertical, endless path located above and in the proximity of the discharge end of the conveyor belt, said path having a lower portion adjacent said conveyor belt and said blades being arranged such that in travelling along the lower path portion they are capable of entering between the articles in engaging relationship, and means are provided for accelerating the present leading article, a blade being positioned between said article and the next article at its rear.

2. Apparatus according to claim 1, characterized in that the blades are mounted for a pivotal movement about an axis extending perpendicular to the plane of the endless path, so as to keep the blades at least during their movement along the lower path portion in a position so that said blades are capable of entering between the articles, and the accelerating means are formed by means for imparting a forward pivotal movement to a blade about its pivot axis in the direction of movement each time after said blade has entered between the two leading articles.

3. Apparatus according to claim 2, characterized in that there is provided a vertical, rotatable disc having openings formed therein at equally spaced positions at its circumference, stub shafts rotatably mounted in said openings each having one end projecting from one side of said disc and its other end projecting from the other side of said disc, said blades each being mounted on the one end of a stub shaft, crank means on the other ends of said stub shafts having transversely projecting guide means provided at free end portions thereof, and a substantially stationary, endless guide track is provided facing said other side of said disc and extending parallel thereto, said guide means of said crank means being accommodated in said guide track, said guide track having a short portion at a lower section thereof which has a radius of curvature which differs considerably from the remainder of the guide track.

4. Apparatus according to claim 3, characterized in that the guide track comprises two portions hinged together at the lower section of the guide track, and means are provided for imparting a pivotal movement to (seen in the direction of movement) the rear portion about the pivot point from or towards the other portion which is stationary, said short portion of the guide track being in the stationary portion.

5. Apparatus according to claim 3 or 4, characterized in that the guide track is formed by a groove, a portion of the inner edge of the groove near the lower section of the guide track being mounted for an inwardly movement while it is kept in the position in alignment with the other part of the inner edge by a spring means.

6. Apparatus according to claim 5, characterized in that the movable inner edge portion, in the inwardly urged position is adapted to cooperate with a switch.

* * * * *